(12) United States Patent
Lim et al.

(10) Patent No.: US 8,578,429 B2
(45) Date of Patent: Nov. 5, 2013

(54) DEVICE AND METHOD FOR OUTPUTTING DATA OF A WIRELESS TERMINAL TO AN EXTERNAL DEVICE

(75) Inventors: Chae-Whan Lim, Daegu (KR); Hyun-Jung Kim, Daegu (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1362 days.

(21) Appl. No.: 11/039,861

(22) Filed: Jan. 24, 2005

(65) Prior Publication Data

US 2005/0186988 A1 Aug. 25, 2005

(30) Foreign Application Priority Data

Feb. 21, 2004 (KR) .................. 10-2004-0011683

(51) Int. Cl.
*H04N 7/18* (2006.01)
(52) U.S. Cl.
USPC .................. 725/81; 725/80; 725/88; 725/90; 725/102; 348/734
(58) Field of Classification Search
USPC .................. 725/88, 90, 102, 80–81; 348/734
See application file for complete search history.

(56) References Cited

U.S. PATENT DOCUMENTS

| | | | | |
|---|---|---|---|---|
| 5,515,173 A | * | 5/1996 | Mankovitz et al. | 386/131 |
| 5,613,191 A | * | 3/1997 | Hylton et al. | 725/81 |
| 5,815,297 A | * | 9/1998 | Ciciora | 398/112 |
| 5,963,202 A | * | 10/1999 | Polish | 715/723 |
| 6,018,768 A | * | 1/2000 | Ullman et al. | 709/218 |
| 6,567,984 B1 | * | 5/2003 | Allport | 725/110 |
| 6,856,997 B2 | * | 2/2005 | Lee et al. | 707/102 |
| 7,058,721 B1 | * | 6/2006 | Ellison et al. | 709/231 |
| 7,174,561 B2 | * | 2/2007 | Bixby et al. | 725/93 |
| 2001/0047517 A1 | * | 11/2001 | Christopoulos et al. | 725/87 |

(Continued)

FOREIGN PATENT DOCUMENTS

| | | |
|---|---|---|
| EP | 1 059 809 | 12/2000 |
| EP | 1 180 903 | 2/2002 |

(Continued)

OTHER PUBLICATIONS

Qualcomm, "Qualcomm CDMA Technologies Delivers World's First CDMA Multimedia Chipset and System Software Solution for Handsets", Aug. 16, 2000, Qualcomm, Aug. 16, 2000 Press Release, 4 Pages.*

*Primary Examiner* — Nicholas Corbo
(74) *Attorney, Agent, or Firm* — Jefferson IP Law, LLP

(57) ABSTRACT

A media device and a method for outputting data stored in a wireless terminal to an external device through the media device are provided. The media device includes a radio frequency (RF) unit for communicating with the wireless terminal; a power supply unit for controlling power of the external device; a control unit for performing control operations for decoding data transmitted from the wireless terminal according to a command transmitted from the wireless terminal and transmitting the decoded data to the external device; and an output unit for transmitting the decoded data to the external device. The method includes powering the media device and the external device when the wireless terminal transmits a power-on command; searching for information relating to reproduction, which is attached to a reproduction command, and responding to the reproduction command when the wireless terminal transmits the reproduction command; and decoding data received from the wireless terminal and outputting the decoded data to the external device when a response to the reproduction command is performed.

25 Claims, 14 Drawing Sheets

(56) References Cited

U.S. PATENT DOCUMENTS

| | | |
|---|---|---|
| 2002/0013820 A1* | 1/2002 | Crandall .................. 709/208 |
| 2002/0026638 A1* | 2/2002 | Eldering et al. ............. 725/42 |
| 2002/0044225 A1* | 4/2002 | Rakib ..................... 348/734 |
| 2004/0158855 A1* | 8/2004 | Gu et al. .................. 725/39 |
| 2004/0266419 A1* | 12/2004 | Arling et al. .............. 455/420 |
| 2005/0164148 A1* | 7/2005 | Sinclair ................... 434/112 |
| 2006/0085823 A1* | 4/2006 | Bell et al. ................. 725/81 |

FOREIGN PATENT DOCUMENTS

| | | |
|---|---|---|
| EP | 1180903 A1 * | 2/2002 |
| KR | 20-0180864 | 5/2000 |
| WO | WO 98/34378 | 8/1998 |

\* cited by examiner

DEVICE AND METHOD FOR OUTPUTTING DATA OF A WIRELESS TERMINAL TO AN EXTERNAL DEVICE

PRIORITY

This application claims the benefit under 35 U.S.C. 119(a) of an application entitled "Device and Method for Outputting Data of Wireless Terminal to External Device" filed in the Korean Intellectual Property Office on Feb. 21, 2004 and assigned Serial No. 2004-11683, the entire contents of which are incorporated herein by reference.

BACKGROUND OF THE INVENTION

1. Field of the Invention

The present invention relates to a media device. More particularly, the present invention relates to a device and a method for outputting data stored in a wireless terminal to an external device.

2. Description of the Related Art

Recently, wireless terminals have been developed to provide a high-speed data transmission function in addition to a voice communication function. A wireless terminal capable of performing data communication can process data including packet data and image data.

Now, wireless terminals have a function of enabling image data to be transmitted/received. Therefore, the wireless terminals can store an image received from a base station and transmit an acquired image to the base station. Such a wireless terminal includes a camera for photographing an image and a display unit for displaying an image photographed by the camera. The camera may include a Charge Coupled Device (CCD) or Complementary Metal Oxide Semiconductor (CMOS) sensor and the display unit may include a Liquid Crystal Display (LCD). In addition, camera devices are being miniaturized. Concomitantly, devices for photographing images also show a tendency to be miniaturized. The wireless terminal can photograph an image to be displayed as a moving picture or a still picture, and can transmit a photographed image to the base station.

According to the increase of the request of providers and users for an image mail, such services as described above are now being provided and are expected to highly increase in the future. In addition, if multimedia data (such as audio data, moving picture data, still picture data, and the like) stored in a wireless terminal can be played by or displayed on an external device, the users' requests may be further satisfied.

SUMMARY OF THE INVENTION

Accordingly, the present invention has been made to solve the above-mentioned problems occurring in the prior art, and an object of the present invention is to provide a media device capable of outputting data stored in a wireless terminal through an external device.

Another object of the present invention is to provide a method for outputting data stored in a wireless terminal through an external device using the media device.

To accomplish these objects, in accordance with one aspect of the present invention, there is provided a media device for outputting data stored in a wireless terminal to an external device through communication with the wireless terminal. The media device comprises a radio frequency (RF) unit for communicating with the wireless terminal; a power supply unit for controlling power of the external device; a control unit for performing control operations for decoding data transmitted from the wireless terminal according to a command transmitted from the wireless terminal and transmitting the decoded data to the external device; and an output unit for transmitting the decoded data to the external device.

In accordance with another aspect of the present invention, there is provided a method for outputting data stored in a wireless terminal to an external device through a media device. The method comprises powering the media device and the external device when the wireless terminal transmits a power-on command; searching for information relating to reproduction, which is attached to a reproduction command, and responding to the reproduction command when the wireless terminal transmits the reproduction command; and decoding data received from the wireless terminal and outputting the decoded data to the external device when a response to the reproduction command is performed.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

Hereinafter, embodiments of a device and a method for outputting data stored in a wireless terminal to an external device according to the present invention will be described with reference to the accompanying drawings. In the following description of the present invention, a detailed description of known functions and configurations incorporated herein will be omitted for conciseness.

Figure 1:
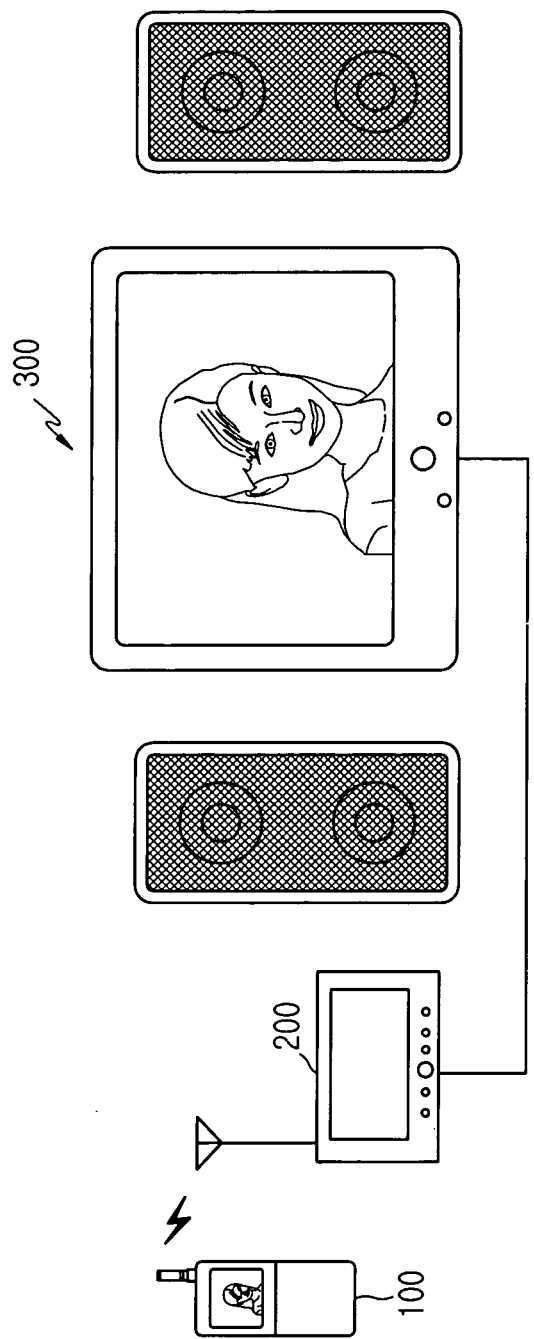
FIG. 1 is a view illustrating a system for transmitting data stored in a wireless terminal to an external device through a media device according to one embodiment of the present invention.

FIG. 1 is a view illustrating a system for transmitting data stored in a wireless terminal to an external device through a media device according to one embodiment of the present invention.

A wireless terminal 100 stores multimedia data. The wireless terminal 100 communicates with a media device 200 to output the multimedia data to an external device 300. Also, the wireless terminal 100 may transmit command signals to control the multimedia data output through the external device 300 while a user listens to or views the multimedia data. The media device 200 communicates with the wireless terminal 100 and outputs multimedia data, which are transmitted from the wireless terminal 100, to the external device 300 to be displayed.

While an embodiment of the present invention will be described on the assumption that the external device 300 is a television, the external device 300 can be replaced by any type of external device (which include a beam projector, and the like) capable of receiving data through the media device 200. Also, an embodiment of the present invention will be described on the assumption that the wireless terminal 100 transmits multimedia data (such as a video clip, audio, a music file, still picture data, TV video data, and so on) through the media device 200 to the external device 300. However, the wireless terminal 100 can transmit not only multimedia data stored in the wireless terminal 100 but also communication data (such as phone book data, and so on) to the media device 200 at each predetermined interval.

The media device 200 functions as an intermediate device for receiving wirelessly coded multi-media data of the wireless terminal 100 and decoding the received data to thereby transmit the same to the external device 300 after analog conversion is performed. Although the media device 200 is shown as being separate from the external device 300, the media device 200 can comprise a module and be integrated into the external device 300 in accordance with an embodiment of the present invention. The media device module would allow the external device 300 to perform the same functions as the media device 200. For example, a media device module implemented in the external device 300 such as a television would allow the television to directly receive TV video data of the wireless terminal 100 wirelessly and decode the received data to thereby display the same on a reproducing module such as a television tube or picture screen.

Figure 2:
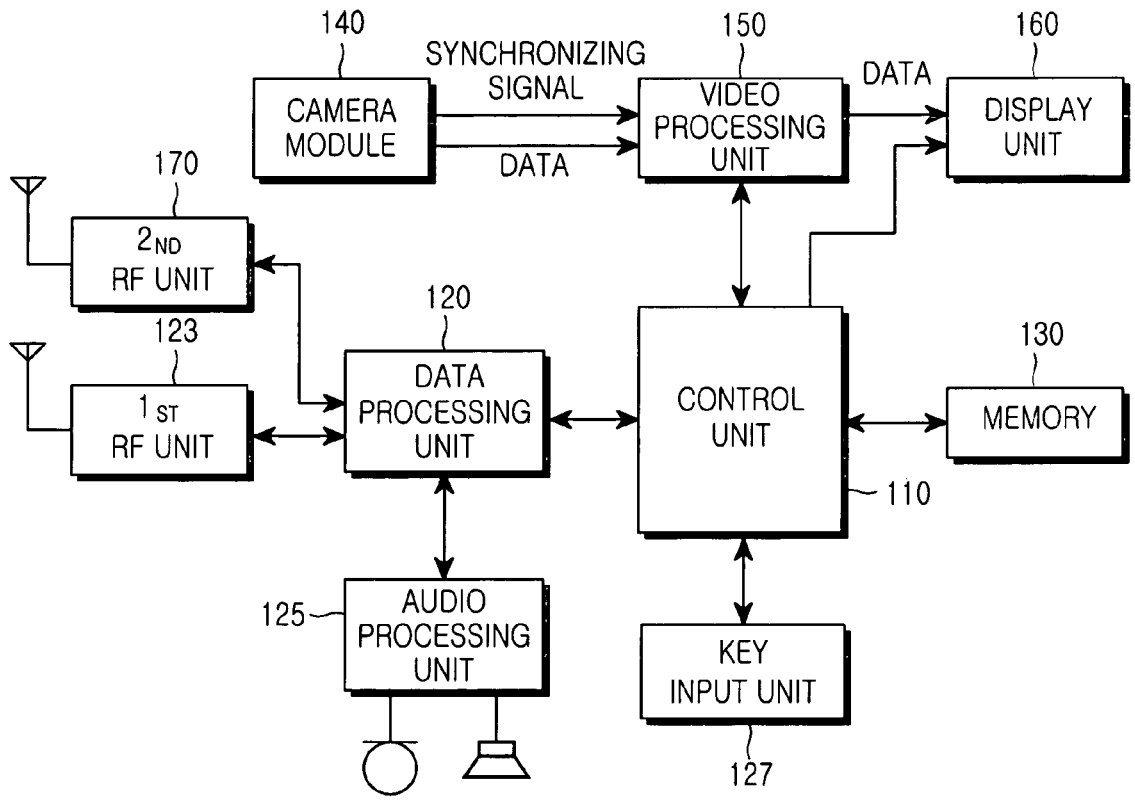
FIG. 2 is a block diagram illustrating the construction of the wireless terminal shown in FIG. 1.

It should be appreciated by those skilled in the art that the external 300 is not limited to a television set. The external device 300 can be a video cassete recorder (VCR), satellite receiver, cable box, digital video recorder or a computer and the like, without departing from the scope of the present invention. FIG. 2 is a block diagram illustrating the construction of the wireless terminal shown in FIG. 1. A first radio frequency (RF) unit 123 performs wireless communication. The first RF unit 123 includes a RF transmitter (not shown) and an RF receiver (not shown), in which the RF transmitter up-converts and amplifies frequencies of a signal to be transmitted, and the RF receiver low-noise amplifies a received signal and down-converts the frequency of the received signal. A second RF unit 170 performs a wireless communication function with the media device 200 through Bluetooth or a wireless Local Area Network (LAN). The second RF unit 170 includes an RF transmitter (not shown) for up-converting and amplifying the frequency of a signal to be transmitted. Of course, it is possible that the first RF unit 123 includes the function of the second RF unit 170 so that the first RF unit 123 may perform the wireless communication function with the media device 200 as well as the normal wireless communication function of the wireless terminal 100.

A data processing unit 120 includes a transmitter (not shown) for encoding and modulating the signal to be transmitted and a receiver (not shown) for demodulating and decoding the received signal. That is, the data processing unit 120 may include a MODEM and a CODEC. Herein, the CODEC includes a data CODEC for processing packet data, and so on, and an audio CODEC for processing audio signals such as voices, and the like. An audio processing unit 125 reproduces a reception audio signal output from the audio CODEC of the data processing unit 120, and transfers a transmission audio signal generated from a microphone to the audio CODEC of the data processing unit 120.

A memory 130 may include a program memory and a data memory. The program memory may store programs for controlling general operations of the wireless terminal and programs for transmitting multimedia data stored in the wireless terminal to the media device according to an embodiment of the present invention. The data memory temporarily stores data generated while the programs are being executed. Also, the memory 130 stores various multimedia data (such as video, audio, music files, pictures, and so on) and communication data (such as phone numbers of a phone book, received/transmitted character data, and so on).

Figure 4A:
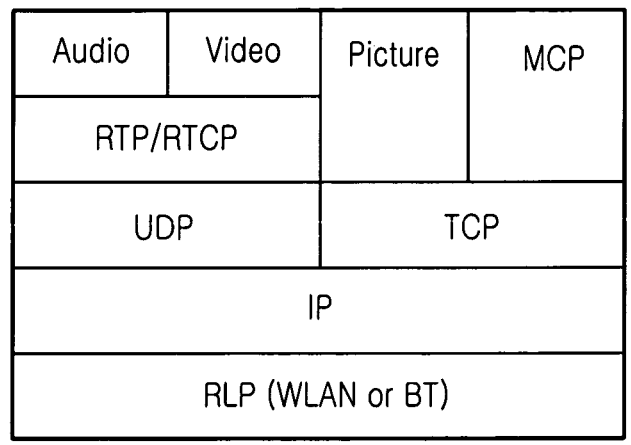
FIG. 4A is a view illustrating a structure of the protocol stack of the wireless terminal shown in FIG. 1.

A control unit 110 controls operations of the wireless terminal. The control unit 110 may include the data processing unit 120. Also, the control unit 110 may control the transmission of data stored in the memory 130 to the media device 200 according to an embodiment of the present invention. Also, the control unit 110 stores a protocol stack for communicating with the media device 200 according to an embodiment of the present invention. FIG. 4A is a view showing a structure of the protocol stack of the wireless terminal. The control unit 110 communicates with the media device 200 through the protocol stack. In the protocol stack of the wireless terminal, Media Control Protocol) (MCP) represents a protocol for enabling the wireless terminal 100 and the media device 200 to communicate with each other according to each media reproduction control command input by a user of the wireless terminal 100. Also, when the wireless terminal 100 includes a TV reception function, the control unit 110 can transmit TV video data, which are received by the wireless terminal 100, to the media device 200 so that the TV video data may be output through the television 300 to be seen and heard by a user.

A camera module 140 includes a camera sensor and a signal processing section. The camera sensor photographs an image and converts a light signal obtained through the photographing into an electric signal. The signal processing section converts an analog image signal obtained through the photographing of the camera sensor into digital data. Herein, it is assumed that the camera sensor is a Charge Coupled Device (CCD) sensor, and the signal processing section may be realized by a digital signal processor (DSP). The camera sensor and the signal processing section may be integrally or separately constructed.

An image processing unit 150 performs a function to generate image data for displaying an image signal output from the camera module 140. The image processing unit 150 processes an image signal, which is output from the camera module 140, in a unit of frame, and outputs the frame image data according to the size and the property of a display unit 160. Also, the image processing unit 150 includes a video CODEC so as to perform a function to compress frame image data displayed on the display unit 160 by using a predetermined method and a function to reproduce original frame image data from compressed frame image data. Herein, the video CODEC may be one of a Joint Picture Experts Group (JPEG) CODEC, a Moving Picture Experts Group 4 (MPEG4) CODEC, a Wavelet CODEC, etc. It is assumed that the image processing unit 150 has an On Screen Display (OSD) function and can output OSD data according to the size of a screen displayed under the control of a control unit 110.

The display unit 160 displays an image signal output from the image processing unit 150 and user data output from the control part 110 on a screen. Herein, the display unit 160 may employ a Liquid Crystal Display (LCD). When the LCD is employed, the display unit 160 may include a LCD controller, a memory for storing image data, an LCD display element, etc. Herein, when the LCD is realized in a touch screen method, the display unit 160 may operate as an input section. In addition, in an embodiment of the present invention, the display unit 160 can display a menu for controlling data which are transmitted from the wireless terminal to the external device in a transmission mode. The menu includes 'power on/off', 'play', 'fast forward', 'rewind', 'pause', 'stop', and so on. A key input unit 127 includes keys used to input numeral and letter information and function keys used to set various functions. In addition, an embodiment of the present invention, the key input unit 127 may include menu keys for controlling data which are transmitted from the wireless terminal to the external device in a transmission mode. The menu keys includes a power on/off key, a play key, a fast forward key, a rewind key, a pause key, a stop key, and so on.

Figure 3:
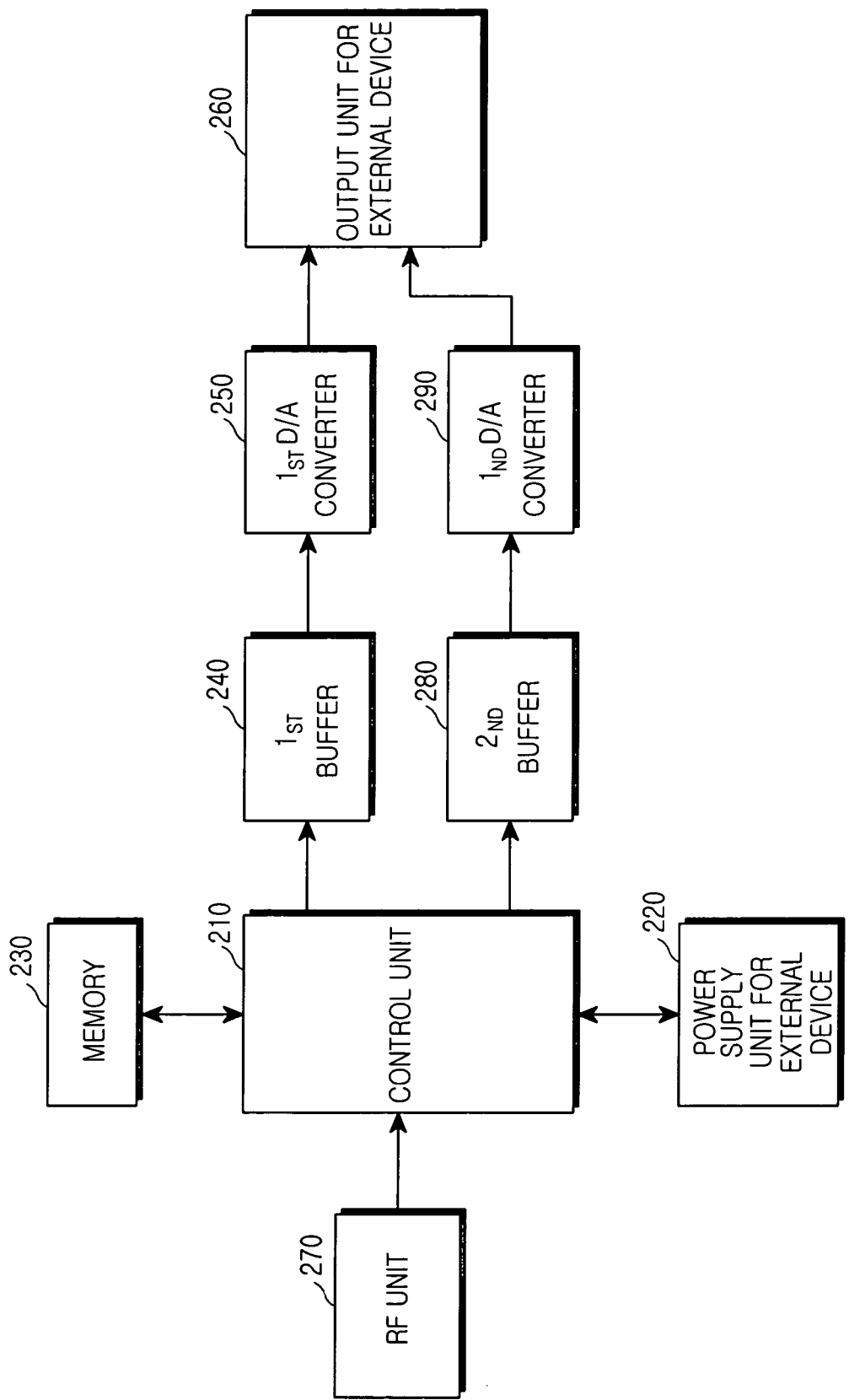
FIG. 3 is a block diagram illustrating a construction of the media device shown in FIG. 2.

FIG. 3 is a block diagram illustrating a construction of the media device shown in FIG. 1. An RF unit 270 performs a wireless communication function with the wireless terminal 100 through Bluetooth or a wireless LAN. The RF unit 270 includes an RF receiver (not shown) which low-noise amplifies a received signal and down-converts the frequency of the received signal. An power supply unit 220 for an external device performs a function to turn on/off the power of the television 300 under to the control of a control unit 210 when a power on/off command is transmitted from the wireless terminal.

Figure 4B:
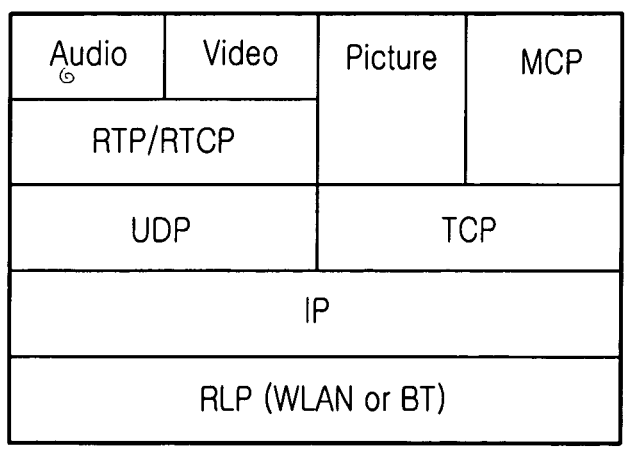
FIG. 4B is a view illustrating a structure of the protocol stack of the media device shown in FIG. 1.

The control unit 210 includes a video CODEC and an audio CODEC. The video CODEC performs a function to restore original frame image data from compressed frame image data transmitted from the wireless terminal 100. Herein, the video CODEC may be one of a JPEG CODEC, an MPEG4 CODEC, a Wavelet CODEC, and so on. The audio CODEC performs a function to restore original frame audio data from compressed frame audio data transmitted from the wireless terminal 100. Herein, the audio CODEC may be one of an Advanced Audio Coding (AAC) CODEC, an Audio Modem Riser (AMR) CODEC, an MP3 CODEC, etc. The control unit 210 decodes data transmitted from the wireless terminal 100 by means of the video CODEC and the audio CODEC and outputs the decoded data to the television 300. In addition, the control unit 210 includes a protocol stack as shown in FIG. 4B and communicate with the wireless terminal 100 through the protocol stack. In the protocol stack of the media device 200, Media Control Protocol (MCP) represents a protocol for enabling the wireless terminal 100 and the media device 200 to communicate with each other according to each command transmitted from the wireless terminal 100. Also, the control unit 210 outputs data transmitted from the wireless terminal 100 to the television 300 according to each command transmitted from the wireless terminal 100. A first buffer 240 stores image data decoded by the video CODEC of the control unit 210, and the image data of a digital signal type stored in the first buffer 240 are converted into an analog signal through a first Digital/Analog (D/A) converter 250. A second buffer 280 stores audio data decoded by the audio CODEC of the control unit 210, and the audio data of a digital signal type stored in the second buffer 280 are converted into an analog signal through a second D/A converter 290.

An output unit 260 for an external device performs a function to output image data transmitted through the first D/A converter 250 and audio data transmitted through the second D/A converter 290, to the television 300 which is an external device. A memory 230 may store programs for controlling a normal operation of the media device 200. In addition, the memory 230 may store multimedia data and communication data transmitted from the wireless terminal 100.

The components of the media device 200 shown in FIG. 3 may be included in the external device 300. Such an external device including the components of the media device can output data stored in the wireless terminal through direct communication with the wireless terminal 100.

Hereinafter, the operation for outputting data stored in the wireless terminal to the television (such as an external device) using the wireless terminal and the media device as shown in FIGS. 2 and 3 will be described in detail with reference to FIGS. 5 to 8.

Figure 5A:
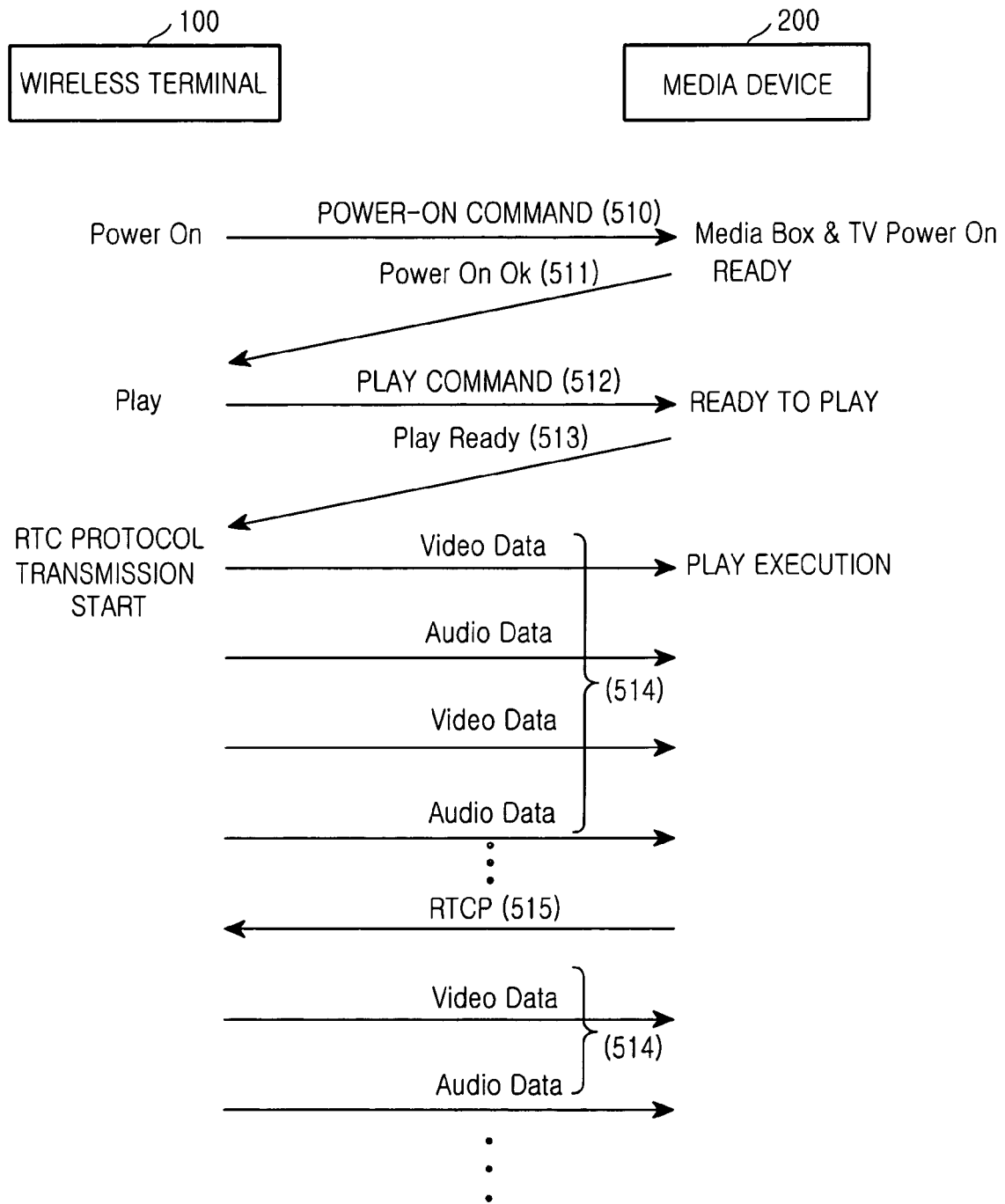
FIGS. 5A to 5D are flow diagrams illustrating procedures of outputting audio/video stored in the wireless terminal to the external device through the media device according one embodiment of the present invention.
Figure 5B:
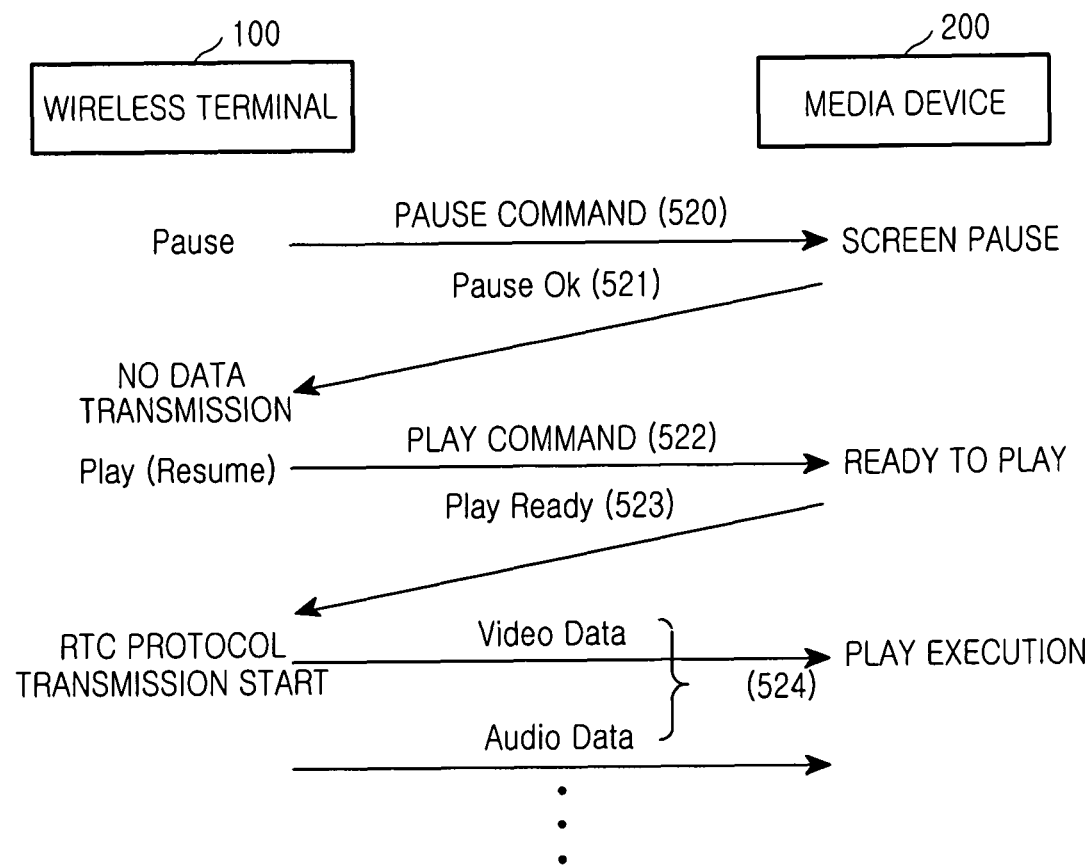
Figure 5C:
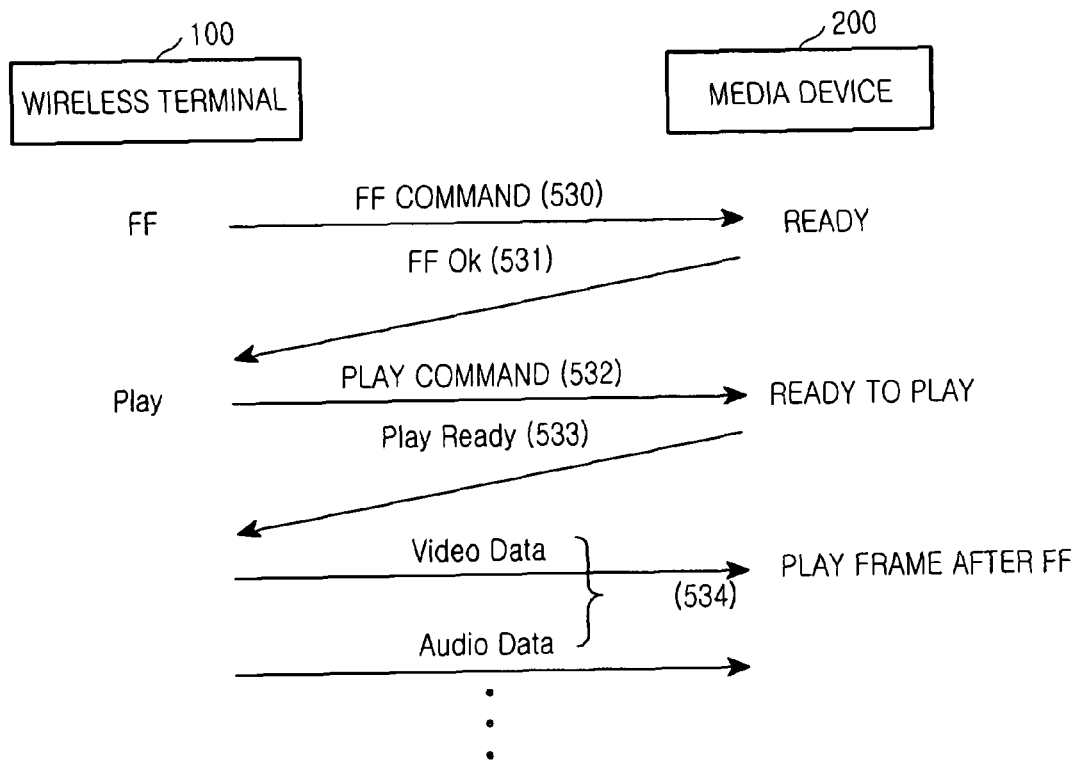
Figure 5D:
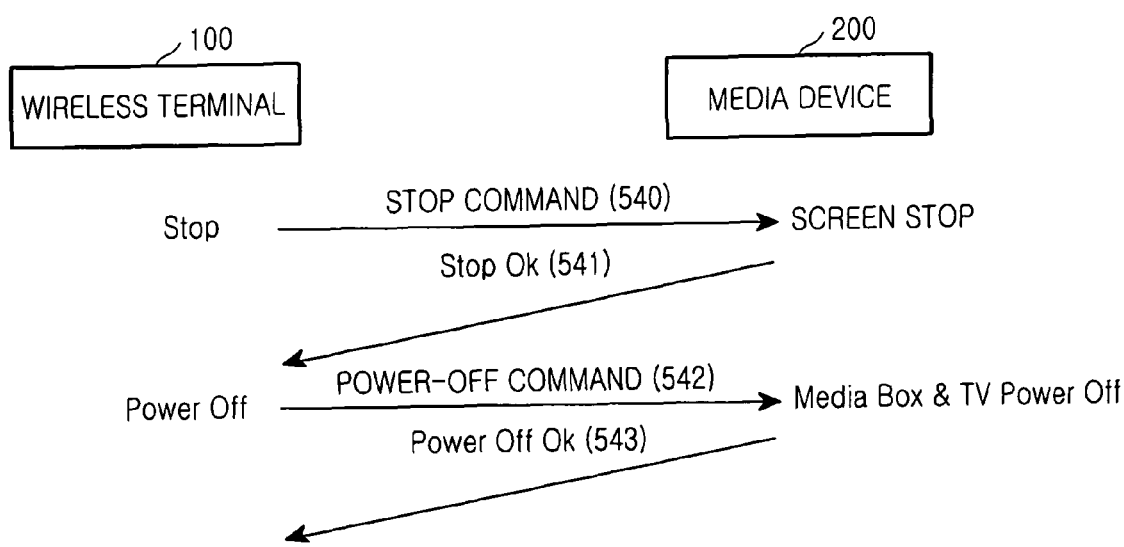

FIGS. 5A to 5D are flow diagrams illustrating procedures of receiving multimedia data relating to audio/video from the wireless terminal and processing the received multimedia data in the media device, that is, procedures of reproducing the audio and video through the television in realtime. FIG. 5A is a flow diagram illustrating a control procedure for powering on the external device and the media device and then reproducing audio/video data through the external device. FIG. 5B is a flow diagram illustrating a control procedure for performing a pause operation for audio/video data reproduced through the external device. FIG. 5C is a flow diagram illustrating a control procedure for performing a fast forward (or a rewind) operation for audio/video data reproduced through the external device. FIG. 5D is a flow diagram illustrating a control procedure for performing a stop operation for audio/video data reproduced through the external device and a power-off operation for the external device and the media device.

Referring to FIG. 5A, when a user of the wireless terminal selects a transmission mode for an external device to transmit data to the external device 300, the control unit 110 detects it and changes the wireless terminal into the transmission mode for an external device. In the transmission mode for an external device, when the user selects a power-on function which is included in the key input unit 127 or is one from among control keys (such as power on/off, play, fast forward, rewind, pause, and stop) for the external device, the control unit 110 detects it and proceeds to step 510 of transmitting a power-on command to the media device 200. When the control unit 210 of the media device 200 receives the power-on command from the wireless terminal 100, the control unit 210 turns on the power source of the media device 200 and controls the power supply unit 220 for the external device to turn on the power of the television 300. Thereafter, in step 511, the control unit 210 of the media device 200 transmits a response message to the wireless terminal 100 in response to the power-on command so as to notify the wireless terminal 100 that the media device 200 and the television 300 are powered on. The wireless terminal 100 and the media device 200 communicates with each other through commands which are input by the user of the wireless terminal and are transmitted through an MCP. When the control unit 110 of the wireless terminal receives the response message from the media device 200 in response to the power-on command, the control unit 110 notifies the user that the media device 200 is ready to play through the display unit 160. When the user selects audio/video data to be transmitted and selects a play function for the selected audio/video data, the control unit 110 detects it and transmits a play command to the media device 200 in step 512. In this case, the control unit 110 transmits information (which relates to playing) to the media device 200, together with the play command. The information relating to the play command includes information relating to data transmitted from the wireless terminal 100 and is accompanied and transmitted whenever the play function is performed.

The control unit 210 of the media device 200 receives the play command, the control unit 210 recognizes the play command and searches for accompanied information relating to the play mode. The information relating to the play mode includes information about a kind of media, a kind of audio CODEC, a kind of video CODEC, a media title, a total play time period, resolution, a bit rate, and a frame number. In step 512, the information relating to the play mode, which is received in the media device 200, may be described as follows:

M=AV, A=AAC, V=MPEG4, S=CIF, MT=Graduation Travel, D=15:30, R=256, and F=0.

Herein, "M=AV" indicates that the type of media corresponds to audio/video data, "A=AAC" indicates that an Advanced Audio Coding (AAA) or MP4 audio CODEC is employed, and "V=MPEG4" indicates that an MPEG4 video CODEC is employed. Also, "S=CIF" indicates that a '352× 288' Common Intermediate Format (CIF) resolution is employed, and "MT=Graduation Travel" indicates that received audio/video data has a title of 'Graduation Travel'. Also, "D=15:30" indicates a total play time period of fifteen hours and thirty minutes, "R=256" indicates a bit rate of 256 kbps, and "F=0" indicates a frame number. The frame number corresponds to a sequence number of Real-time Transport Protocol (RTP)/Real-time Transport Control Protocol (RTCP) for realtime data transmission. When the control unit 210 of the media device finds the information relating to the play, the control unit 210 performs step 513. In step 513, the control unit 210 transmits a response message, which provides an indication that the media device 200 is ready to play, to the wireless terminal 100 in response to the play command. When the wireless terminal 100 receives the response message from the media device 200 in response to the play command, the control unit 110 of the wireless terminal detects it and transmits the audio/video data to the media device 200 through the RTC protocol in step 514. In step 514, when the media device 200 receives the audio/video data from the wireless terminal 100, the control unit 210 of the media device 200 detects it and decodes the audio/video data by means of a video CODEC and an audio CODEC included in the control unit 210. The control unit 210 stores the video data from among the decoded audio/video data in the first buffer 240 and then converts the video data stored in a type of digital signal format into an analog signal through the first D/A converter 250. Also, the control unit 210 stores the audio data in the second buffer 280 and then converts the audio data stored in the type of digital signal format into an analog signal through the second D/A converter 290. The audio/video data converted into analog signals are output through the output unit 260 for an external device to the television 300, thereby being reproduced.

While the audio/video data are being reproduced through the television 300, the control unit 210 performs step 515, in which the control unit 210 transmits information relating to a current connection state between the wireless terminal 100 and the media device 200 to the wireless terminal 100 through the RTC protocol at a predetermined period of time. Meanwhile, when the user of the wireless terminal 100, who is seeing and hearing the audio/video data reproduced through the television 300 in steps 514 and 515, selects a pause function, the control unit 110 of the wireless terminal detects it and proceeds to step 520 shown in FIG. 5B, in which the control unit 110 transmits a pause command to the media device 200.

Referring to FIG. 5B, when the media device 200 receives the pause command from the wireless terminal 100, the control unit 210 of the media device 200 detects it and performs a control operation to stop the output of data to the external device 300 and to pause the current image. During such a paused state, the control unit 210 discards all of audio/video data received to the control unit 210. In step 521, when the wireless terminal 100 receives a response message from the media device 200 in response to the pause command, the control unit 110 of the wireless terminal 100 detects it and stops transmitting the audio/video data. In such a paused state, when the user of the wireless terminal 100 selects a play function, the control unit 110 detects it and transmits a play command to the media device 200 in step 522. When the wireless terminal 100 receives a response message, which indicates that the media device 200 is ready to play, from the media device 200 in step 523 in response to the play command, the control unit 110 of the wireless terminal 100 detects it and performs step 524 in which the control unit 110 transmits the audio/video data to the media device 200 through the RTC protocol. In this case, data transmitted to the media device 200 in step 524 are data of a frame number following that of the data transmitted just before the pause command is transmitted. That is, when the pause command is transmitted in step 520 after data of frame number '99' are transmitted to the media device 200, data transmitted in step 522 are data of frame number '100'.

Meanwhile, when the user of the wireless terminal 100, who is seeing and hearing the audio/video data reproduced through the television 300, selects a fast forward function, the control unit 110 of the wireless terminal detects it and proceeds to step 530 shown in FIG. 5C, in which the control unit 110 transmits a fast forward (FF) command to the media device 200.

Referring to FIG. 5C, when the media device 200 receives the fast forward command from the wireless terminal 100, the control unit 210 of the media device 200 detects it and performs a control operation to stop the output of data to the external device 300 and to pause the current image. During such a paused state, the control unit 210 discards all of audio/video data received to the control unit 210. In step 531, when the wireless terminal 100 receives a response message, which indicates that the data output to the external device stops, from the media device 200 in response to the fast forward command, the control unit 110 of the wireless terminal 100 detects it and transmits a play command to the media device 200 in step 532. When the control unit 110 of the wireless terminal receives a response message, which indicates that the media device 200 is ready to play, from the media device 200 in response to the play command, the control unit 110 detects it and skips frames at a predetermined time interval (such as 5 or 10 minutes) from the frame stopped according to the transmission of the fast forward command. The control unit 110 skips video data frames at the predetermined time interval (such as 5 or 10 minutes) corresponding to one frame. Then, the control unit 110 performs step 534 in which the control unit 110 transmits data to the media device 200, from data having a frame number of the jumped location. Whenever the user selects the fast forward function, the control unit 110 skips data frames in a forward direction at the predetermined time interval (such as 5 or 10 minutes) as described above. In contrast, when the user selects the rewind function, the control unit 110 detects it, jumps frames at the predetermined time interval (such as 5 or 10 minutes) in a reverse direction from the stopped frame, and then performs a play operation.

Meanwhile, when the user of the wireless terminal 100, who is seeing and hearing the audio/video data reproduced through the television 300, selects a stop function, the control unit 110 of the wireless terminal detects it and proceeds to step 540 shown in FIG. 5D, in which the control unit 110 transmits a stop command to the media device 200. Referring to FIG. 5D, when the media device 200 receives the stop command from the wireless terminal 100, the control unit 210 of the media device 200 detects it and performs a control operation to stop the output of data to the external device 300 and to stop the current image. During such a stopped state, the control unit 210 discards all of audio/video data received to the control unit 210. In step 541, when the wireless terminal 100 receives a response message, which indicates that the data output to the external device stops, from the media device 200 in response to the stop command, the control unit 110 of the wireless terminal 100 detects it and waits for an input of the user. In this state, when the user selects a power-off function, the control unit 110 of the wireless terminal detects it and performs step 542 of transmitting a power-off command to the media device 200. When the control unit 210 of the media device 200 receives the power-off command, the control unit 210 detects it, controls the power supply unit 220 for an external device to turn off the power of the television 300 which is an external device, and also turns off the power of the media device 200 itself. In this case, the control unit 210 leaves a portion of the power relating to the power on/off function of the media device 200 itself. When the powers of the television 300 and the media device 200 are turned off, the media device 200 transmits a response message, which informs that the powers of the television 300 and the media device 200 are turned off, to the wireless terminal 100 in step 543 in response to the power-off command.

Figure 6A:
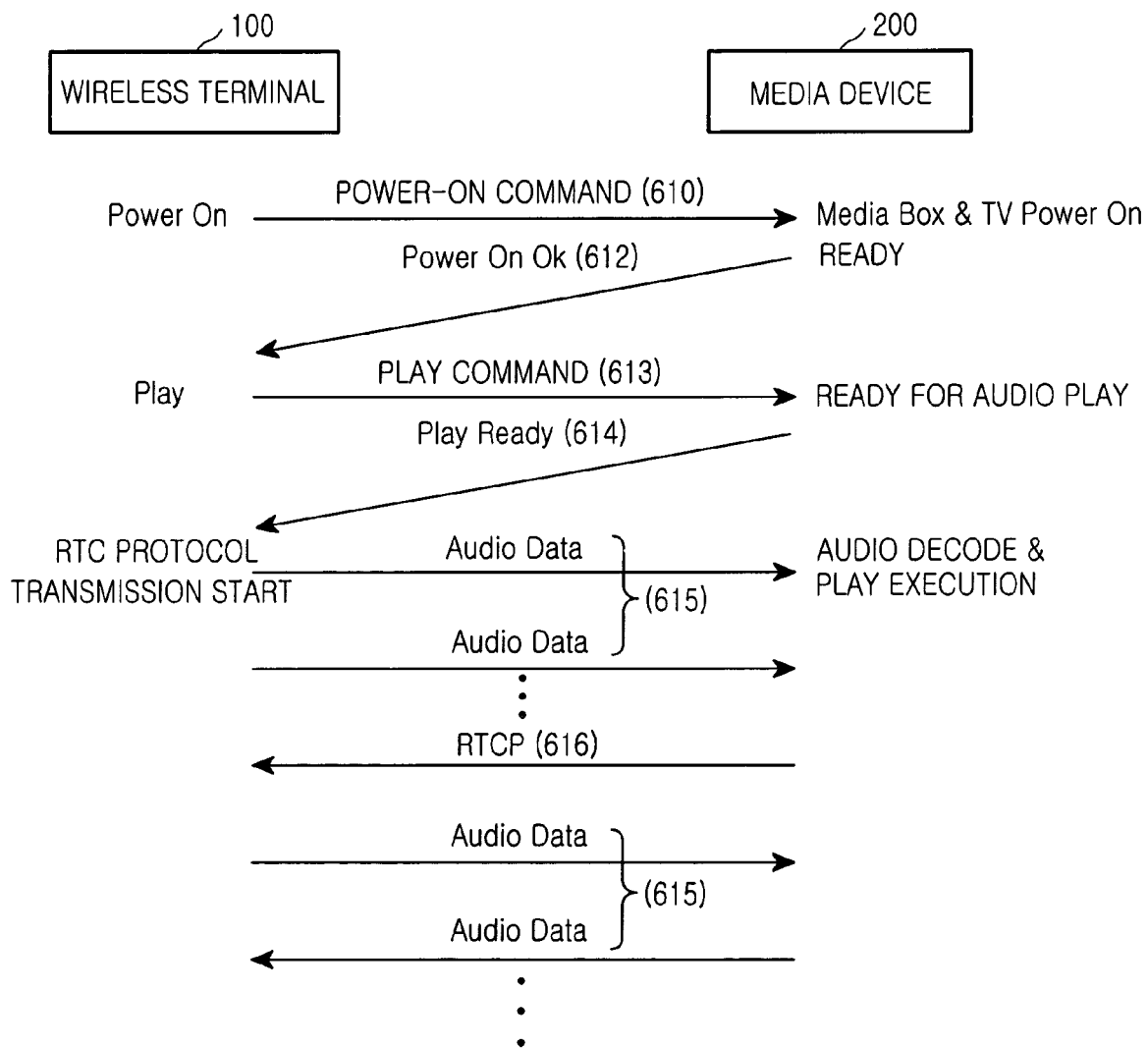
FIGS. 6A to 6D are flow diagrams illustrating procedures of outputting audio stored in the wireless terminal to the external device through the media device according one embodiment of the present invention.
Figure 6B:
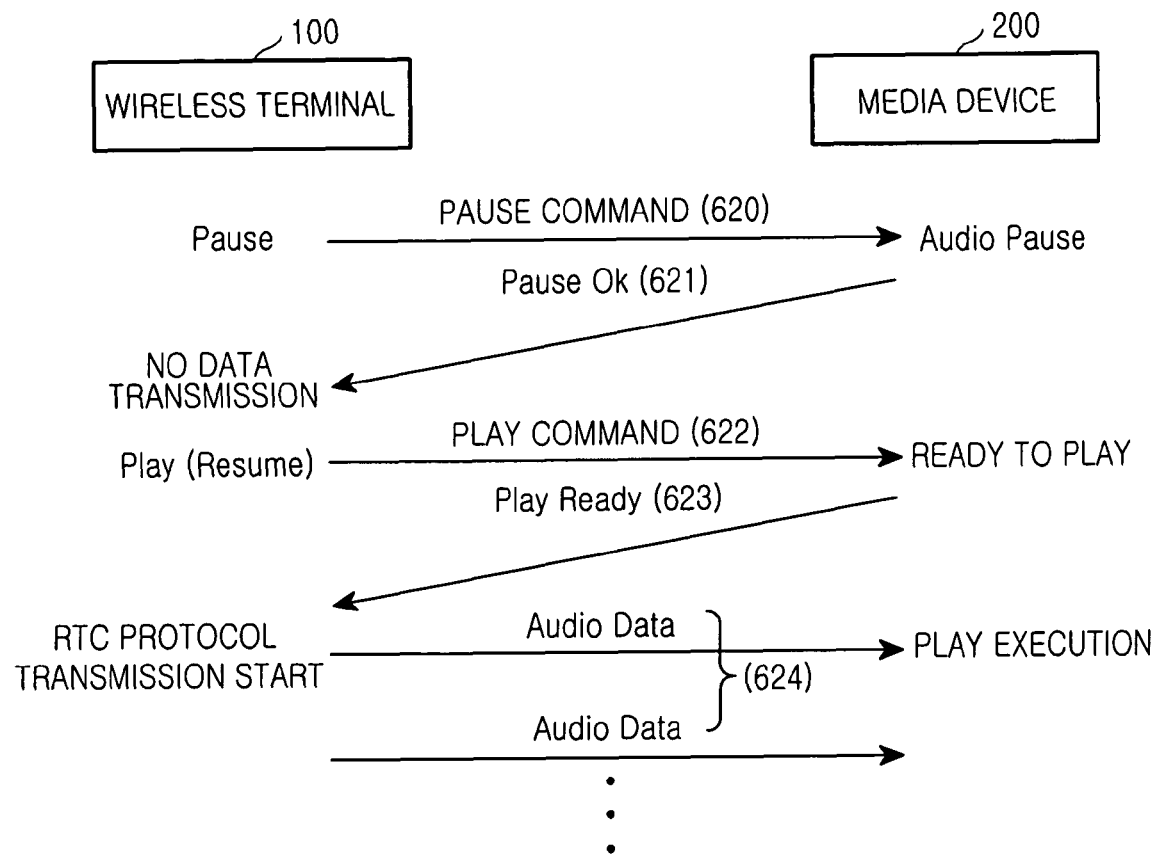
Figure 6C:
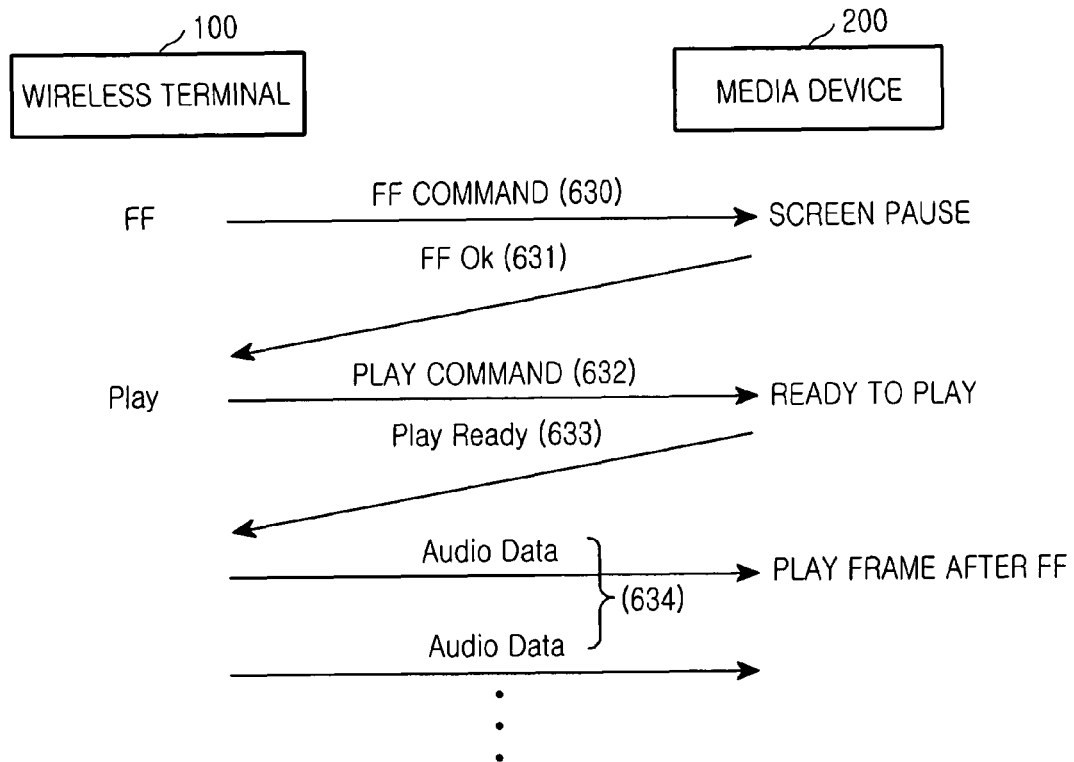
Figure 6D:
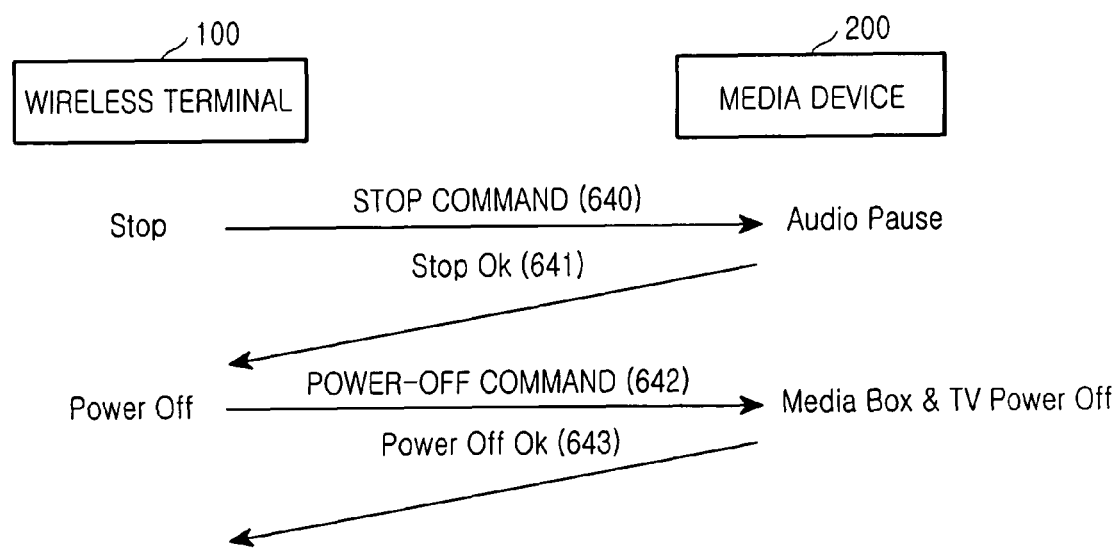

FIGS. 6A to 6D are flow diagrams illustrating procedures of receiving multimedia data relating to audio from the wireless terminal and processing the received multimedia data in the media device, that is, procedures of outputting audio data through the television. FIG. 6A is a flow diagram illustrating a control procedure for powering on of the external device and the media device and then for reproducing audio data through the external device. FIG. 6B is a flow diagram illustrating a control procedure for performing a pause operation for audio data reproduced through the external device. FIG. 6C is a flow diagram illustrating a control procedure for performing a fast forward (or a rewind) operation for audio data reproduced through the external device. FIG. 6D is a flow diagram illustrating a control procedure for performing a stop operation for audio data reproduced through the external device and a power-off operation for the external device and the media device.

Hereinafter, the control procedures shown in FIGS. 6A to 6D will be described in detail with reference to FIGS. 1 to 4.

Referring to FIG. 6A, when a user of the wireless terminal selects a transmission mode for an external device to transmit data to the television 300, the control unit 110 detects it and changes the wireless terminal into the transmission mode for an external device. In the transmission mode for an external device, when the user selects a power-on function which is included in the key input unit 127 or is one from among control keys (such as power on/off, play, fast forward, rewind, pause, and stop) for the external device, the control unit 110 detects it and proceeds to step 610 of transmitting a power-on command to the media device 200. When the control unit 210 of the media device 200 receives the power-on command from the wireless terminal 100, the control unit 210 turns on the power source of the media device 200 and then controls the power supply unit 220 for an external device to turn on the power of the television 300. Thereafter, in step 612, the control unit 210 of the media device 200 transmits a response message, which indicates that the media device 200 and the television 300 are powered on, to the wireless terminal 100 in response to the power-on command. When the control unit 110 of the wireless terminal receives the response message from the media device 200 in response to the power-on command, the control unit 110 notifies the user that the media device 200 is ready to play through the display unit 160. When the user selects data to be transmitted and selects the play function for the selected data, the control unit 110 detects it and transmits a play command to the media device 200 in step 613. In this case, the control unit 110 transmits information relating to the play mode to the media device 200, together with the play command. In step 613, the information relating to the play mode, which is received in the media device 200, may be described as follows:

M=A, A=AAC, MT=Graduation, D=5:30, R=128, and F=0.

Herein, "M=A" indicates the type of media corresponds to audio data, "A=AAC" represents that an Advanced Audio Coding (AAA) or MP4 audio CODEC is employed, and "MT=Graduation" indicates that received audio data has a title of 'Graduation'. Also, "D=5:30" indicates a total play time period of five hours and thirty minutes, "R=128" indicates a bit rate of 256 kbps, and "F=0" indicates an audio frame number. The frame number corresponds to a sequence number of RTC protocol for realtime data transmission. When the control unit 210 of the media device finds the information relating to the play, the control unit 210 performs step 614 in which the control unit 210 transmits a response message, which indicates that the media device 200 is ready for audio play, to the wireless terminal 100 in response to the play command. When the wireless terminal 100 receives the response message from the media device 200 in response to the play command, the control unit 110 of the wireless terminal detects it and transmits the audio data to the media device 200 in realtime through the RTC protocol in step 615. In step 615, when the media device 200 receives the audio data from the wireless terminal 100, the control unit 210 of the media device 200 detects it and decodes the audio data by means of an audio CODEC included in the control unit 210. The control unit 210 stores the decoded audio data in the second buffer 280 and then converts the audio data stored in a digital signal format into an analog signal through the second D/A converter 290. The audio data converted into an analog signal are output through the output unit 260 for an external device to the television 300 which is an external device, thereby being reproduced. While the audio data are being reproduced through the television 300, the control unit 210 performs step 616, in which the control unit 210 transmits information relating to a current connection state between the wireless terminal 100 and the media device 200 to the wireless terminal 100 through the RTC protocol at a predetermined period of time. Meanwhile, when the user of the wireless terminal 100, who is hearing the audio data reproduced through the television 300 in steps 615 and 616, selects a pause function, the control unit 110 of the wireless terminal detects it and proceeds to step 620 shown in FIG. 6B, in which the control unit 110 transmits a pause command to the media device 200.

Referring to FIG. 6B, when the media device 200 receives the pause command from the wireless terminal 100, the control unit 210 of the media device 200 detects it and performs a control operation to stop the output of data to the television 300 and to pause the current image. During such a paused state, the control unit 210 discards all of audio data received to the control unit 210. In step 621, when the wireless terminal 100 receives a response message from the media device 200 in response to the pause command, the control unit 110 of the wireless terminal 100 detects it and stops transmitting the audio data. In such a paused state, when the user of the wireless terminal 100 selects a play function, the control unit 110 detects it and transmits a play command to the media device 200 in step 622. When the wireless terminal 100 receives a response message, which indicates that the media device 200 is ready to play, from the media device 200 in step 623 in response to the play command, the control unit 110 of the wireless terminal 100 detects it and performs step 624 in which the control unit 110 transmits the audio data to the media device 200 in realtime through the RTC protocol. In this case, data transmitted to the media device 200 in step 624 are data of a frame number following that of the data transmitted just before the pause command is transmitted. That is, in the case in which the pause command is transmitted after data of frame number '99' are transmitted to the media device 200, data of frame number '100' are transmitted when play is initiated after the pause.

Meanwhile, when the user of the wireless terminal 100, who is hearing the audio data reproduced through the television 300, selects a fast forward function, the control unit 110 of the wireless terminal detects it and proceeds to step 630 shown in FIG. 6C, in which the control unit 110 transmits a fast forward command to the media device 200. Referring to FIG. 6C, when the media device 200 receives the fast forward command from the wireless terminal 100, the control unit 210 of the media device 200 detects it and performs a control operation to stop the output of data to the television 300 and to pause the current image. During such a paused state, the control unit 210 discards all of audio data received to the control unit 210. In step 631, when the wireless terminal 100 receives a response message, which indicates that the data output to the external device stops, from the media device 200 in response to the fast forward command, the control unit 110 of the wireless terminal 100 detects it and transmits a play command to the media device 200 in step 632. When the control unit 110 of the wireless terminal receives a response message, which indicates that the media device 200 is ready to play, from the media device 200 in step 633 in response to the play command, the control unit 110 detects it and skips frames at a predetermined time interval (such as 5 or 10 minutes) from a frame stopped in process of reproduction. Then the control unit 110 performs step 634 in which the control unit 110 transmits data to the media device 200, from data having a frame number of the jumped location. Whenever the user selects the fast forward function, the control unit 110 skips frames in a forward direction at the predetermined time interval (such as 5 or 10 minutes) as described above. In contrast, when the user selects the rewind function, the control unit 110 detects it, skips frames at the predetermined time interval (such as 5 or 10 minutes) in a reverse direction from a stopped frame, and then performs a play operation.

Meanwhile, when the user of the wireless terminal 100, who is hearing the audio data reproduced through the television 300, selects a stop function, the control unit 110 of the wireless terminal detects it and proceeds to step 640 shown in FIG. 6D, in which the control unit 110 transmits a stop command to the media device 200.

Referring to FIG. 6D, when the media device 200 receives the stop command from the wireless terminal 100, the control unit 210 of the media device 200 detects it and performs a control operation to stop the output of data to the television 300 and to stop the current image. During such a stopped state, the control unit 210 discards all of audio data received to the control unit 210. In step 641, when the wireless terminal 100 receives a response message from the media device 200 in response to the stop command, the control unit 110 of the wireless terminal 100 detects it and waits for an input of the user. In this state, when the user selects a power-off function, the control unit 110 of the wireless terminal detects it and performs step 642 of transmitting a power-off command to the media device 200. When the control unit 210 of the media device 200 receives the power-off command, the control unit 210 detects it, controls the power supply unit 220 for an external device to turn off the power of the television 300 which is an external device, and also turns off the power of the media device 200 itself. In this case, the control unit 210 leaves a portion of the power relating to the power on/off function of the media device 200 itself. When the powers of the television 300 and the media device 200 are turned off, the media device 200 transmits a response message, which indicates that the powers of the television 300 and the media device 200 are turned off, to the wireless terminal 100 in response to the power-off command in step 643.

Figure 7:
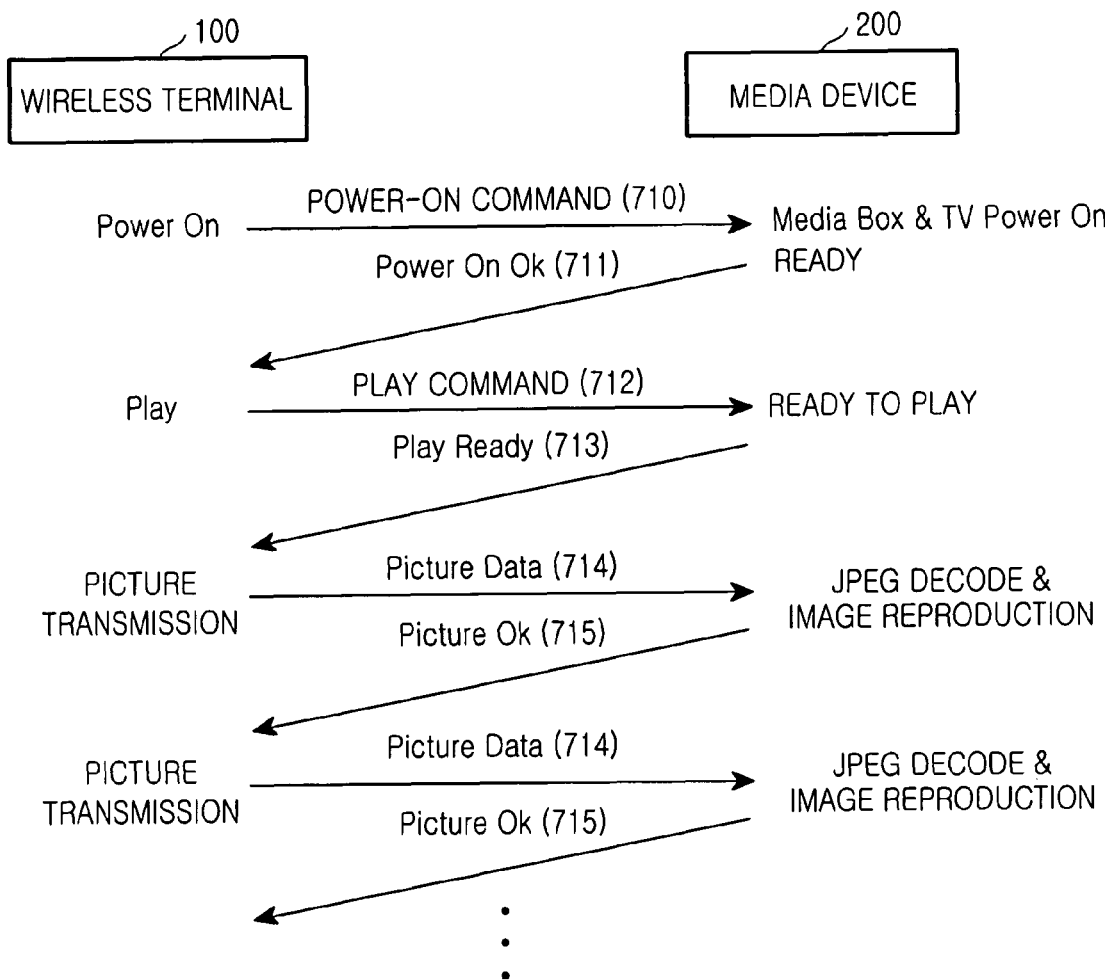
FIG. 7 is a flow diagram illustrating a procedure of outputting still picture data stored in the wireless terminal to the external device through the media device according one embodiment of the present invention.

FIG. 7 is a flow diagram illustrating a procedure of receiving multimedia data relating to a picture from the wireless terminal and processing the received multimedia data. That is, FIG. 7 illustrates a control procedure of turning on the powers of the media device and the external device and then outputting picture data to the external device. This embodiment of the present invention will be described with respect to a case in which data of a picture are output and displayed through the television 300 whenever a user selects the picture. However, it will be understood by those skilled in the art that the embodiment of the present invention can be applied to a method of continuously outputting data of a plurality of pictures to the television 300 through the media device 200 to be displayed.

Hereinafter, the control procedure shown in FIG. 7 will be described in detail with reference to FIGS. 1 to 4.

Referring to FIG. 7, when a user of the wireless terminal selects a transmission mode for an external device to transmit data to the external device 300, the control unit 110 detects it and changes the wireless terminal into the transmission mode for an external device. In the transmission mode for an external device, when the user selects a power-on function which is included in the key input unit 127 or is one from among control keys (such as power on/off, play, fast forward, rewind, pause, and stop) for the external device, the control unit 110 detects it and proceeds to step 710 of transmitting a power-on command to the media device 200. When the control unit 210 of the media device 200 receives the power-on command from the wireless terminal 100, the control unit 210 turns on the power source of the media device 200 and then controls the power supply unit 220 for an external device to turn on the power of the television 300. Thereafter, in step 711, the control unit 210 of the media device 200 transmits a response message, which indicates that the media device 200 and the television 300 are powered on, to the wireless terminal 100 in response to the power-on command. When the control unit 110 of the wireless terminal receives the response message from the media device 200 in response to the power-on command, the control unit 110 notifies the user that the media device 200 is ready to play through the display unit 160. When the user selects picture data to be transmitted and selects the play for the selected picture data, the control unit 110 detects it and transmits a play command to the media device 200 in step 712. In this case, the control unit 110 transmits information relating to the play mode to the media device 200, together with the play command. In step 712, when the transmitted picture data are expressed as "Graduation picture.JPG" which represents JPEG image data, the information relating to the play mode may be accompanied as follows:

M=P (Picture), and V=JPEG.

When the control unit 210 of the media device finds the information relating to the play, the control unit 210 performs step 713 in which the control unit 210 transmits a response message, which indicates that the media device 200 is ready for picture data reproduction, to the wireless terminal 100 in response to the play command. When the wireless terminal 100 receives the response message, which indicates that the media device 200 is ready to play, from the media device 200 in response to the play command, the control unit 110 of the wireless terminal detects it and transmits the picture data to the media device 200 in step 714. In this case, the control unit 110 transmits information relating to the play mode to the media device 200, together with the play command. The information relating to the picture data includes information (MT="Graduation Picture") for providing the title of the picture data. Whenever the control unit 110 transmits picture data to the media device 200, the control unit 110 transmits information relating to the picture together with the transmitted picture data to the media device 200. In step 714, when the media device 200 receives the picture data from the wireless terminal 100, the control unit 210 of the media device 200 detects it and decodes the picture data by means of a video CODEC included in the control unit 210. The control unit 210 stores the decoded picture data in the first buffer 240 and then converts the picture data stored in a digital signal format into an analog signal through the first D/A converter 250. The picture data converted into an analog signal are output through the output unit 260 for an external device to the television 300, thereby being reproduced. During the output of the picture through the television 300, when the user selects a second picture and selects the play function, steps 712 to 714 are repeated, thereby displaying the second picture on the screen of the television 300.

Figure 8A:
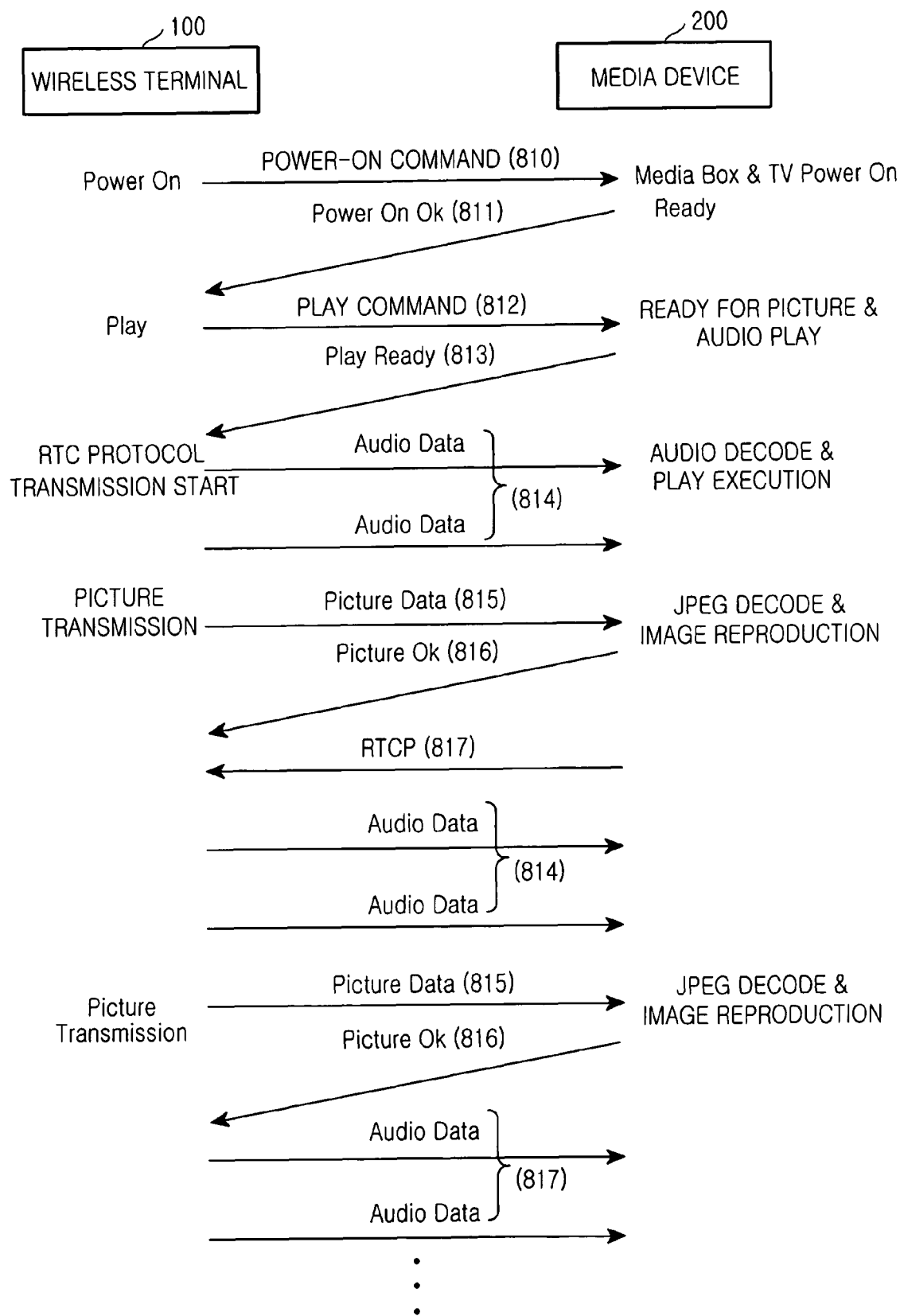
FIGS. 8A to 8C are flow diagrams illustrating procedures of outputting still picture and audio data stored in the wireless terminal to the external device through the media device according one embodiment of the present invention.
Figure 8B:
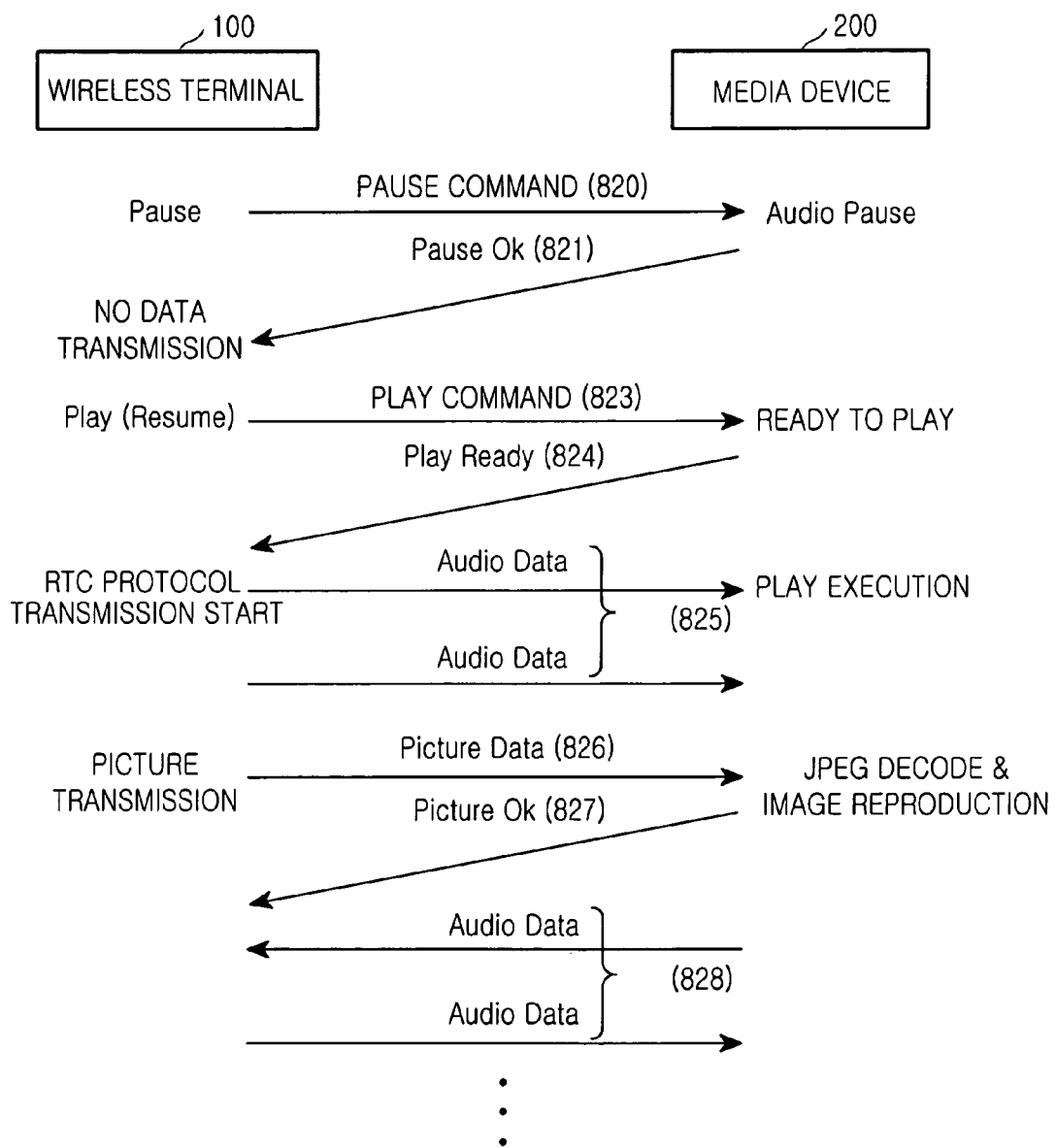
Figure 8C:
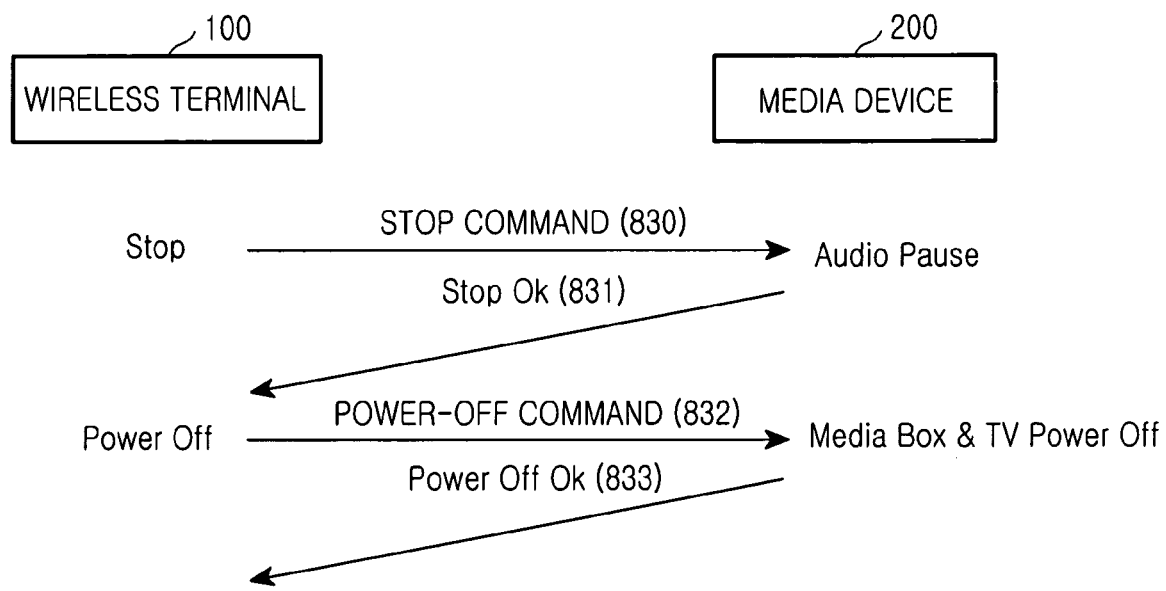

FIGS. 8A to 8C are flow diagrams illustrating procedures of receiving multimedia data relating to audio/picture from the wireless terminal and processing the received multimedia data in the media device, that is, procedures of reproducing the audio and picture through the external device. FIG. 8A is a flow diagram illustrating a control procedure for powering on the external device and the media device and then for reproducing audio/picture data through the external device. FIG. 8B is a flow diagram illustrating a control procedure for performing a pause operation for audio/picture data reproduced through the external device. FIG. 8C is a flow diagram illustrating a control procedure for performing a stop operation for audio/picture data reproduced through the external device and a power-off operation for the external device and the media device. This embodiment of the present invention will be described with respect to procedures of displaying data of a picture selected by a user through the external device 300 while audio data are being reproduced through the external device 300. However, it should be understood by those skilled in the art that the embodiment of the present invention will can be applied to a sliding function of continuously outputting a plurality of pictures selected by a user through the external device 300 while audio data is being reproduced through the external device 300.

Hereinafter, the control procedures shown in FIGS. 8A to 8C will be described in detail with reference to FIGS. 1 to 4.

Referring to FIG. 8A, when a user of the wireless terminal selects a transmission mode for an external device to transmit data to the external device 300, the control unit 110 detects it and changes the wireless terminal into the transmission mode for an external device. In the transmission mode for an external device, when the user selects a power-on function which is included in the key input unit 127 or is one from among control keys (such as power on/off, play, fast forward, rewind, pause, and stop) for the external device, the control unit 110 detects it and proceeds to step 810 of transmitting a power-on command to the media device 200. When the control unit 210 of the media device 200 receives the power-on command from the wireless terminal 100, the control unit 210 turns on the power source of the media device 200 and controls the power supply unit 220 for the external device to turn on the power of the television 300. Thereafter, in step 811, the control unit 210 of the media device 200 transmits a response message, which indicates that the media device 200 and the external device 300 are powered on, to the wireless terminal 100 in response to the power-on command. When the control unit 110 of the wireless terminal receives the response message from the media device 200 in response to the power-on command, the control unit 110 notifies the user that the media device 200 is ready to play through the display unit 160. When the user selects audio and picture data to be transmitted and then selects the play for the selected audio and picture data, the control unit 110 detects it and transmits a play command to the media device 200 in step 812. In this case, the control unit 110 transmits information relating to the play to the media device 200, together with the play command. When the transmitted audio data have a play time period of five minutes and thirty seconds, a bit rate of 128 kbps and an AAA audio clip of 'Graduation.acc', the information relating to the play mode, which is transmitted to the media device 200, may be described as follows:

M=AP, A=AAC, MT=Graduation, D=5:30, R=128, and F=0.

When the control unit 210 of the media device finds the information relating to the play, the control unit 210 performs step 813, in which the control unit 210 transmits a response message to the wireless terminal 100 in response to the play command. When the wireless terminal 100 receives the response message, which indicates that the media device 200 is ready to play, from the media device 200 in response to the play command, the control unit 110 of the wireless terminal detects it and transmits the audio data to the media device 200 in realtime through the RTC protocol in step 814. In step 814, when the media device 200 receives the audio data from the wireless terminal 100, the control unit 210 of the media device 200 detects it and decodes the audio data by means of an audio CODEC included in the control unit 210. The control unit 210 stores the decoded audio data in the second buffer 280 and then converts the audio data stored in the type of digital signal into an analog signal through the second D/A converter 290. The audio data converted into an analog signal are output through the output unit 260 for an external device to the television 300, thereby being reproduced.

Simultaneously while outputting the audio data, the control unit 110 of the wireless terminal performs step 815 of transmitting picture data to the media device 200. The control unit 110 of the wireless terminal transmits the picture data to the media device 200, together with information relating to the picture. When the picture data are expressed as "Graduation picture.JPG" which is JPEG image data, the information relating to a picture as described below may be transmitted to the media device 200.

M=Graduation Picture and V=JPEG.

When the control unit 210 of the media device receives the picture data and the information relating to the picture from the wireless terminal 100 in step 815, the control unit 210 detects it and decodes the picture data by means of a video CODEC included in the control unit 210. The control unit 210 stores the decoded picture data in the first buffer 240 and then converts the picture data stored in a digital format signal into an analog signal through the first D/A converter 250. The picture data converted into an analog signal are output through the output unit 260 for an external device to the television 300 which is an external device, thereby being reproduced. When the picture data are output and displayed through the television 300, together with the reproduction of the audio data, the control unit 210 of the media device performs step 816, wherein the control unit 210 transmits a response message, which indicates that the picture data are displayed through the external device 300, to the wireless terminal 100. While the audio/picture data are being reproduced through the television 300, the control unit 210 performs step 817, in which the control unit 210 transmits information relating to a current connection state between the wireless terminal 100 and the media device 200 to the wireless terminal 100 through the RTC protocol at a predetermined period of time. While the audio/picture data are being reproducing through the television 300, when the user of the wireless terminal 100 wireless terminal 100 selects another picture and selects the play function, steps 815 to 817 are repeated, thereby displaying the selected picture, with the audio data reproduced, through the television 300.

Meanwhile, when the user of the wireless terminal 100, who is seeing and hearing the audio/picture data reproduced through the television 300 in steps 814 to 817, selects a pause function, the control unit 110 of the wireless terminal detects it and proceeds to step 820 shown in FIG. 8B, in which the control unit 110 transmits a pause command to the media device 200.

Referring to FIG. 8B, when the media device 200 receives the pause command from the wireless terminal 100, the control unit 210 of the media device 200 detects it and performs a control operation to stop the output of audio data to the external device 300 and to pause the current image. During such a paused state, the control unit 210 discards all of audio/picture data received to the control unit 210. In step 821, when the wireless terminal 100 receives a response message from the media device 200 in response to the pause command, the control unit 110 of the wireless terminal 100 detects it and stops transmitting the audio/picture data. In such a paused state, when the user of the wireless terminal 100 selects a play function, the control unit 110 detects it and transmits a play command to the media device 200 in step 823. When the wireless terminal 100 receives a response message, which indicates that the media device 200 is ready to play, from the media device 200 in step 824 in response to the play command, the control unit 110 of the wireless terminal 100 detects it and performs step 825 in which the control unit 110 transmits the audio data to the media device 200 through the RTC protocol. In this case, data transmitted to the media device 200 in step 825 are data of a frame number following that of the data transmitted just before the pause command is transmitted. That is, in the case in which the pause command is transmitted after data of frame number '99' are transmitted to the media device 200, the audio data of frame number '100' are transmitted when play resumes after the pause operation. While the audio is being reproduced, when picture data selected by the user are transmitted, steps 826 and 827 are performed to output the picture data to the television 300, thereby displaying the picture on the television 300. A procedure performed by the steps 826 and 827 is equal to the procedure performed by the steps 815 and 816.

Meanwhile, when the user of the wireless terminal 100, who is seeing and hearing the audio/picture data reproduced through the television 300, selects a stop function, the control unit 110 of the wireless terminal detects it and proceeds to step 830 shown in FIG. 8C, in which the control unit 110 transmits a stop command to the media device 200.

Referring to FIG. 8C, when the media device 200 receives the stop command from the wireless terminal 100, the control unit 210 of the media device 200 detects it and performs a control operation to stop the output of audio data to the external device 300 and to stop the current image. During such a stopped state, the control unit 210 discards all of audio/picture data received to the control unit 210. In step 831, when the wireless terminal 100 receives a response message from the media device 200 in response to the stop command, the control unit 110 of the wireless terminal 100 detects it and waits for an input of the user. In this state, when the user selects a power-off function, the control unit 110 of the wireless terminal detects it and performs step 832 of transmitting a power-off command to the media device 200. When the control unit 210 of the media device 200 receives the power-off command, the control unit 210 detects it, controls the power supply unit 220 for an external device to turn off the power of the television 300 which is an external device, and also turns off the power of the media device 200 itself. In this case, the control unit 210 leaves a portion of the power relating to the power on/off function of the media device 200 itself. When the powers of the television 300 and the media device 200 are turned off, the media device 200 transmits a response message, which indicates that the powers of the television 300 and the media device 200 are turned off, to the wireless terminal 100 in step 833 in response to the power-off command.

As described above, the media device according to this embodiment of the present invention enables a user to see and hear data stored in the wireless terminal through an external device and also enables the user to remotely control the external device by the wireless terminal.

While the present invention has been shown and described with reference to certain embodiments thereof, it should be understood by those skilled in the art that various changes in form and details may be made therein without departing from the spirit and scope of the invention as defined by the appended claims. Accordingly, the scope of the invention is not to be limited by the above embodiments but by the claims and the equivalents thereof.

What is claimed is:

1. A media device for outputting data stored in a wireless terminal to an external device through communication with the wireless terminal, the media device comprising:
    a radio frequency (RF) unit for communicating with the wireless terminal; and
    a control unit for detecting a command transmitted from the wireless terminal, detecting, when the command transmitted from the wireless terminal is a play command, at least one of a media title, a resolution, and a bit rate attached to the play command transmitted from the wireless terminal, sending a response message to the wireless terminal in response to the play command, receiving multimedia data from the wireless terminal, decoding the multimedia data received from the wireless terminal and transmitting the decoded multimedia data to the external device, and stopping transmitting the decoded multimedia data to the external device when the command is a stop command, wherein the wireless terminal transmits the command and the multimedia data when the wireless terminal is in transmission mode for the external device.

2. The media device as claimed in claim 1, further comprising:
   a first buffer for storing video data;
   a first Digital/Analog (D/A) converter for converting the video data stored in the first buffer, which are digital data, into an analog signal;
   a second buffer for storing audio data; and
   a second D/A converter for converting the audio data stored in the second buffer, which are digital data, into an analog signal.

3. The media device as claimed in claim 1, further comprising:
   a radio frequency unit for communicating signals to the wireless device.

4. The media device as claimed in claim 3, further comprising:
   the wireless terminal and the media device communicate using at least one of Bluetooth and a wireless local area network.

5. The media device as claimed in claim 3, wherein the wireless terminal and the media device communicate using a protocol stack.

6. The media device as claimed in claim 5, wherein the protocol stack comprises a Media Control Protocol.

7. The media device as claimed in claim 1, further comprising:
   a memory for storing programs.

8. The media device as claimed in claim 3, further comprising:
   the wireless terminal and the media device communicate using at least one of Bluetooth and a wireless local area network.

9. The media device as claimed in claim 1, wherein the control unit comprises a video codec and an audio codec.

10. The media device as claimed in claim 9, wherein the audio codec comprises at least one of an Advanced Audio Coding (AAC) codec, an Audio Modem Riser (AMR) codec and a multimedia player 3 (MP3) codec.

11. The media device as claimed in claim 9, wherein the video codec comprises at least one of a Joint Picture Experts Group (JPEG) codec and a Moving Picture Experts Group 4 (MPEG4) codec.

12. An external device for reproducing a multimedia data, comprising:
   a media device module for detecting a command transmitted from a wireless terminal, detecting, when the command transmitted from the wireless terminal is a play command, at least one of a media title, a resolution, and a bit rate attached to the play command transmitted from the wireless terminal, sending a response message to the wireless terminal in response to the play command, receiving multimedia data from the wireless terminal, decoding multimedia data received from the wireless terminal and transmitting the decoded multimedia data to the external device, and stopping transmitting the decoded multimedia data to the reproducing module when the command is a stop command; and
   the reproducing module for receiving the decoded multimedia data and reproducing multimedia data according to the received decoded multimedia data,
   wherein the wireless terminal transmits the command and the multimedia data when the wireless terminal is in transmission mode for the external device.

13. The device as claimed in claim 12, wherein the media device module comprises:
   a radio frequency (RF) unit for communicating with the wireless terminal;
   a power supply unit for controlling power of the external device, and
   an output unit for decoding the multi-media data sent by the wireless terminal and transmitting the same to the reproducing module.

14. The device as claimed in claim 12, wherein the media device module comprises:
   a first buffer for storing video data;
   a first digital/analog (D/A) converter for converting the video data stored in the first buffer, which are digital data, into an analog signal;
   a second buffer for storing audio data; and
   a second digital/analog (D/A) converter for converting the audio data stored in the second buffer, which are digital data, into an analog signal.

15. The device as claimed in claim 12, wherein the external device comprises a television and the wireless terminal comprises a mobile phone.

16. The device as claimed in claim 12, wherein the reproducing module comprises one of a television tube and picture screen.

17. A method for outputting data stored in a wireless terminal to an external device through a media device, the method comprising the steps of:
   (a) detecting a command transmitted from the wireless terminal;
   (b) detecting, when the command transmitted from the wireless terminal is a play command, at least one of a media title, a resolution, and a bit rate attached to the play command transmitted from the wireless terminal, sending a response message to the wireless terminal in response to the play command, receiving multimedia data from the wireless terminal, decoding multimedia data received from the wireless terminal and transmitting the decoded multimedia data to the external device; and
   (c) stopping transmitting the decoded multimedia data to the external device when the command is a stop command.

18. The method as claimed in claim 17, further comprising the step of:
   powering on the media device and the external device if the command is a power-on command for instructing powering on the media device and the external device;
   wherein the media device controls the powering on of the external device upon receiving the power-on command.

19. The method as claimed in claim 17, wherein the information relating to playing multimedia data includes information regarding at least one of a medium, an audio CODEC, a video CODEC, a media title, a total play time period, resolution, a bit rate, and a frame number.

20. The method as claimed in claim 17, wherein the step (c) comprises:
   stopping transmitting multimedia data to the external device if the command is a pause command for instructing pausing current playing of multimedia data;
   wherein the method further comprises:
   sending a response message to the wireless terminal in response to the pause command;
   receiving a second play command for instructing playing multimedia data from the wireless terminal;

receiving multimedia data of a frame (N+1) following a frame (N) of data transmitted from the wireless terminal just before the pause command is transmitted from the wireless terminal; and decoding the received multimedia data according to the second play command and transmitting the decoded multimedia data to the external device according to the second play command.

21. The method as claimed in claim 17, wherein the step (c) comprises:

stopping transmitting multimedia data to the external device if the command is a fast forward command for instructing fast forwarding current playing of multimedia data;

wherein the method further comprises: sending a response message to the wireless terminal in response to the fast forward command;

receiving a second play command for instructing playing multimedia data from the wireless terminal;

receiving multimedia data of a frame which corresponds to a location jumped in a forward direction over a predetermined time interval; and decoding the received multimedia data according to the second play command and transmitting the decoded multimedia data to the external device according to the second play command.

22. The method as claimed in claim 17, wherein the step (c) comprises:

stopping transmitting multimedia data to the external device if the command is a rewind command for instructing rewinding current playing of multimedia data;

wherein the method further comprises:

sending a response message to the wireless terminal in response to the rewind command;

receiving a second play command for instructing playing multimedia data from the wireless terminal;

receiving multimedia data having a frame number which corresponds to a location jumped in a reverse direction over a predetermined time interval; and decoding the received multimedia data according to the second play command and transmitting the decoded multimedia data to the external device according to the second play command.

23. The method as claimed in claim 17, wherein the step (c) comprises:

stopping transmitting multimedia data to the external device if the command is a stop command for instructing stopping current playing of multimedia data; and wherein the method further comprises:

receiving a second play command for instructing playing multimedia data transmitted from the wireless terminal on the external device from the wireless terminal;

decoding multimedia data received from the wireless terminal according to the second play command and transmitting the decoded multimedia data to the external device according to the second play command after.

24. The method as claimed in claim 17, further comprising the step of turning off the media device and the external device when receiving a power-off command from the wireless terminal for instructing powering off the media device and the external device;

wherein the media device controls the powering off of the external device upon receiving the power-off command.

25. The media device as claimed in claim 1, further comprising:

a power supply unit for controlling powering-on or powering-off of the external device;

wherein the control unit turns on a power source of the media device and controls the power supply unit to power-on the external device if the command is a power-on command for instructing powering on the media device and the external device, and turns off the power source of the media device and controls the power supply unit to power-off the external device if the command is a power-off command for instructing powering off the media device and the external device.

* * * * *